US009838632B2

(12) United States Patent
Furumochi

(10) Patent No.: US 9,838,632 B2
(45) Date of Patent: Dec. 5, 2017

(54) IMAGE PROCESSING APPARATUS CAPABLE OF MOVIE RECORDING, IMAGE PICKUP APPARATUS, CONTROL METHOD THEREFOR, AND STORAGE MEDIUM

(71) Applicant: CANON KABUSHIKI KAISHA, Tokyo (JP)

(72) Inventor: Hiroyuki Furumochi, Musashimurayama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/567,341

(22) Filed: Dec. 11, 2014

(65) Prior Publication Data

US 2015/0172595 A1    Jun. 18, 2015

(30) Foreign Application Priority Data

Dec. 16, 2013 (JP) ................................. 2013-259305

(51) Int. Cl.
*H04N 5/378*    (2011.01)
*H04N 5/232*    (2006.01)
(Continued)

(52) U.S. Cl.
CPC .......... *H04N 5/378* (2013.01); *H04N 5/2351* (2013.01); *H04N 5/2353* (2013.01);
(Continued)

(58) Field of Classification Search
None
See application file for complete search history.

(56) References Cited

U.S. PATENT DOCUMENTS 6,839,452 B1 * 1/2005 Yang ....................... H03F 3/082
348/E3.02
7,106,374 B1 * 9/2006 Bandera ............. H04N 5/23206
348/170
(Continued)

FOREIGN PATENT DOCUMENTS

JP    2003-087630 A    3/2003
JP    2012-151706 A    8/2012

OTHER PUBLICATIONS

Office Action issued in Chinese Patent Application No. 201410779801.2 dated Apr. 26, 2017. English translation provided.

*Primary Examiner* — Timothy J Henn
(74) *Attorney, Agent, or Firm* — Rossi, Kimms & McDowell LLP

(57) ABSTRACT

An image processing apparatus that correctly acquires evaluation values when movie recording is performed at a fixed frame rate. A first readout unit reduces readout rows of an image pickup device, and acquires and outputs image data for movie recording from the reduced readout rows. A second readout unit acquires image data from readout rows that do not overlap with that by the first readout unit at higher rate than the first readout unit, and outputs the acquired image data simultaneously with the first readout unit. Whether a subject's state changes for both the image data acquired by the first and second readout units is determined. If it is determined that the subject's state in the image data acquired by the second readout unit is changed, a speed at which the second readout unit acquires image data is changed while the first readout unit maintains a fixed speed.

10 Claims, 9 Drawing Sheets

(51) Int. Cl.
  *H04N 5/235*  (2006.01)
  *H04N 5/77*  (2006.01)
  *H04N 9/80*  (2006.01)
  *H04N 5/345*  (2011.01)
  *H04N 5/353*  (2011.01)
  *H04N 9/804*  (2006.01)

(52) U.S. Cl.
  CPC ......... *H04N 5/23245* (2013.01); *H04N 5/345* (2013.01); *H04N 5/3535* (2013.01); *H04N 5/772* (2013.01); *H04N 9/8042* (2013.01)

(56) References Cited

U.S. PATENT DOCUMENTS

| | | | |
|---|---|---|---|
| 8,441,535 B2* | 5/2013 | Morin | H04N 5/345 348/148 |
| 2009/0225189 A1 | 9/2009 | Morin | |
| 2010/0007766 A1* | 1/2010 | Ogawa | H04N 5/23232 348/229.1 |
| 2012/0182455 A1* | 7/2012 | Gomi | H04N 5/23245 348/311 |
| 2012/0189263 A1 | 7/2012 | Kato et al. | |
| 2015/0002715 A1* | 1/2015 | Ise | H04N 5/23212 348/308 |
| 2015/0163434 A1* | 6/2015 | Ishibashi | G02B 7/34 348/66 |
| 2015/0163440 A1* | 6/2015 | Furumochi | H04N 9/735 348/223.1 |
| 2016/0014359 A1* | 1/2016 | Ota | H04N 5/3696 348/223.1 |

* cited by examiner

IMAGE PROCESSING APPARATUS CAPABLE OF MOVIE RECORDING, IMAGE PICKUP APPARATUS, CONTROL METHOD THEREFOR, AND STORAGE MEDIUM

BACKGROUND OF THE INVENTION

Field of the Invention

The present invention relates to an image processing apparatus such as a digital still camera and digital video camera capable of movie recording, a control method therefor, and a storage medium.

Description of the Related Art

For an image processing apparatus such as a digital still camera capable of movie recording, techniques to switch a frame rate in accordance with changes in luminance are known. For example, an image pickup device that detects the luminance level of an image acquired from a CMOS or CCD image pickup device, compares this luminance level with a preset threshold value, and increases or decreases the frame rate if determining the need of switching a frame rate, is known (Japanese Laid-Open Patent Publication (Kokai) No. 2003-87630).

In addition, techniques to adjust image pickup conditions in accordance with the state of a subject in movie recording in order to continually maintain AE (automatic exposure) and AWB (auto white balance) suitable for the state of the subject, is known (Japanese Laid-Open Patent Publication (Kokai) No. 2012-151706).

These techniques enable performing movie recording while changing a frame rate such that the movie recording can be performed while continually maintaining the conditions of the AE and AWB suitable for the state of the subject.

However, in the above-described Japanese Laid-Open Patent Publication (Kokai) No. 2003-87630 and Japanese Laid-Open Patent Publication (Kokai) No. 2012-151706, the frame rate in the movie recording has to be changed in accordance with various conditions of a subject, and thus it is difficult to deal with the condition that the movie recording is performed at a fixed frame rate. In addition, when the movie recording is performed at a fixed frame rate, a subject having a low luminance raises a problem in that evaluation values of AF (autofocus), AE, AWB, and the like cannot be correctly acquired because of a fixed upper limit of an exposure time for the subject.

SUMMARY OF THE INVENTION

The present invention provides an image processing apparatus that correctly acquires evaluation values of AF, AE, and AWB also in a case where movie recording is performed at a fixed frame rate, a control method of the image processing apparatus, and a storage medium.

Accordingly, a first aspect of the present invention provides an image processing apparatus that controls driving of an image pickup device to record a movie, the image processing apparatus comprising a first readout unit configured to reduce readout rows of the image pickup device, and to acquire and output image data for movie recording from the reduced readout rows, a second readout unit configured to, in the image pickup device, acquire image data from readout rows that do not overlap with the readout rows read out by the first readout unit, at higher rate than the first readout unit, and output the acquired image data simultaneously with the first readout unit, a determination unit configured to determine whether a state of a subject changes or not, with respect to both the image data acquired by the first readout unit and the image data acquired by the second readout unit, and a changing unit configured to, if the determination unit determines that the state of the subject in the image data acquired by the second readout unit changes, change a speed at which the second readout unit acquires image data in accordance with the change in the state of the subject, while the first readout unit acquires image data at a fixed speed.

Accordingly, a second aspect of the present invention provides an image pickup apparatus, comprising an image pickup device configured to have a plurality of pixels arranged in a two-dimensional array, and a control unit configured to individually control readout rates for respective areas of the image pickup device, wherein in a case where an image signal is repeatedly read out from a first area of the image pickup device for movie recording, the control unit changes a readout rate for a second area, which is different from the first area, according to a luminance of a subject while maintaining a readout rate for the first area.

Accordingly, a third aspect of the present invention provides a control method of an image processing apparatus that control driving of an image pickup device to record a movie, the control method comprising a first readout step of reducing readout rows of the image pickup device, and of acquiring and outputting image data for movie recording from the reduced readout rows, a second readout step of, in the image pickup device, acquiring image data from readout rows that do not overlap with the readout rows read out in the first readout step, at higher rate than the first readout step, and outputting the acquired image data simultaneously with the first readout step; a determination step of determining whether a state of a subject changes or not, with respect to both the image data acquired in the first readout step and the image data acquired in the second readout step, and a changing step of, if it is determined in the determination step that the state of the subject in the image data acquired in the second readout step changes, changing a speed at which image data is acquired in the second readout step in accordance with the change in the state of the subject, while image data is acquired at a fixed speed in the first readout step.

Accordingly, a fourth aspect of the present invention provides a control method for an image pickup apparatus including an image pickup device having a plurality of pixels arranged in a two-dimensional array, the control method comprising a control step of individually controlling readout rates for respective areas of the image pickup device, wherein in a case where an image signal is repeatedly read out from a first area of the image pickup device for movie recording, a readout rate for a second area, which is different from the first area, is changed in the control step according to a luminance of a subject while maintaining a readout rate for the first area.

Accordingly, a fifth aspect of the present invention provides a non-transitory computer readable storage medium that stores a program configured to cause a computer to execute a control method of an image processing apparatus that controls driving of an image pickup device to record a movie, the control method comprising a first readout step of reducing readout rows of the image pickup device, and of acquiring and outputting image data for movie recording from the reduced readout rows, a second readout step of, in the image pickup device, acquiring image data from readout rows that do not overlap with the readout rows read out in the first readout step, at higher rate than the first readout step, and outputting the acquired image data simultaneously with the first readout step, a determination step of determining whether a state of a subject changes or not, with respect to both the image data acquired in the first readout step and the image data acquired in the second readout step, and a changing step of, if it is determined in the determination step that the state of the subject in the image data acquired in the second readout step changes, changing a speed at which image data is acquired in the second readout step in accordance with the change in the state of the subject, while image data is acquired at a fixed speed in the first readout step.

Accordingly, a sixth aspect of the present invention provides a non-transitory computer readable storage medium that stores a program configured to cause a computer to execute a control method for an image pickup apparatus including an image pickup device having a plurality of pixels arranged in a two-dimensional array, the control method comprising a control step of individually controlling readout rates for respective areas of the image pickup device, wherein in a case where an image signal is repeatedly read out from a first area of the image pickup device for movie recording, a readout rate for a second area, which is different from the first area, is changed in the control step according to a luminance of a subject while maintaining a readout rate for the first area.

According to the present invention, a mainstream and a substream are used, a frame rate in the substream is changed to a frame rate suitable for the state of a subject while a movie is recorded at a fixed frame rate in the mainstream, and thus it is possible to correctly acquire evaluation values of AF, AE and AWB also in the case where movie recording is performed at a fixed frame rate.

Further features of the present invention will become apparent from the following description of exemplary embodiments (with reference to the attached drawings).

DESCRIPTION OF THE EMBODIMENTS

An example of an embodiment of the present invention will be described below with reference to the drawings.

Figure 1:
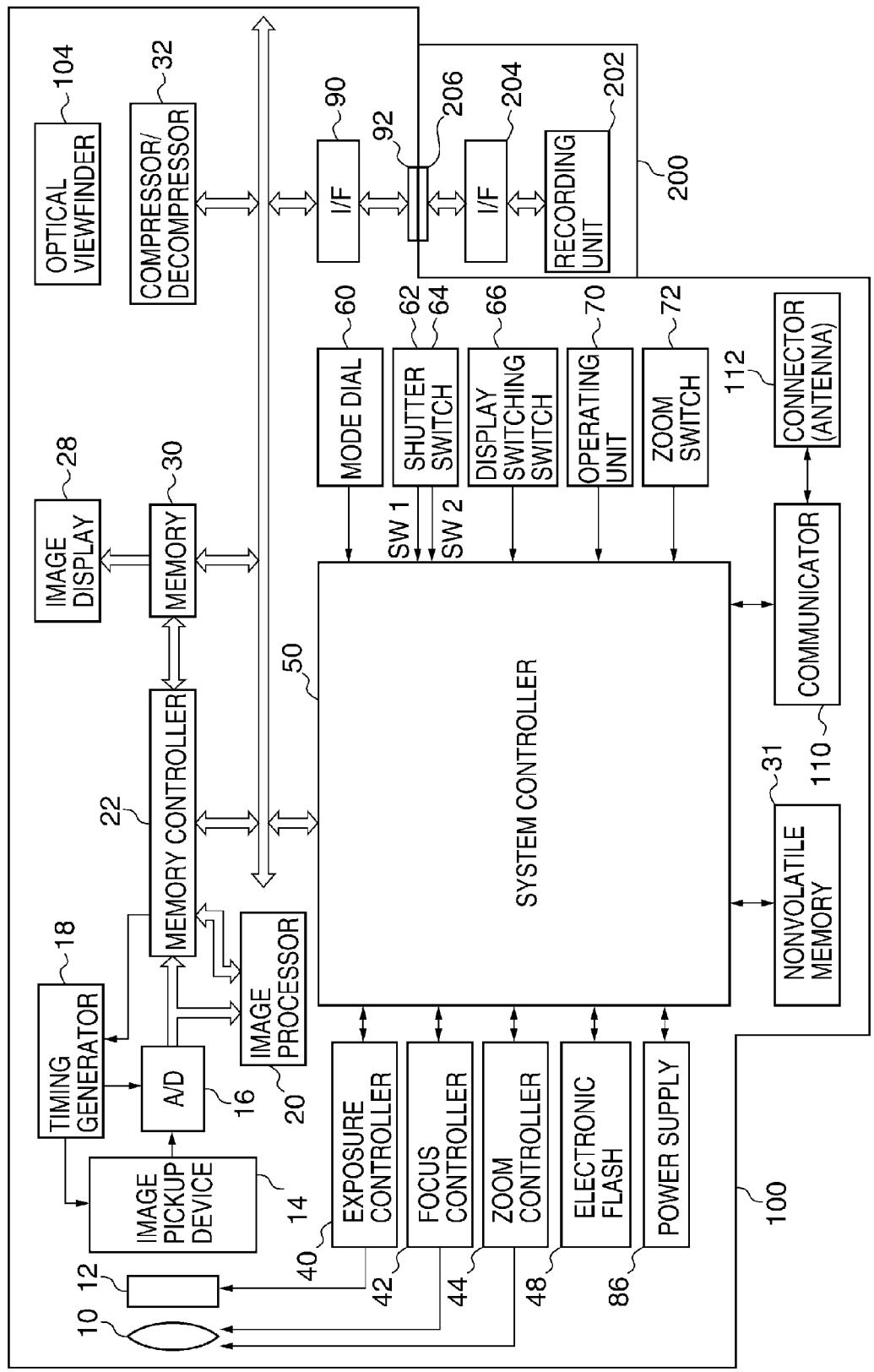
FIG. 1 is a schematic block diagram of a digital still camera being an example of an embodiment of an image processing apparatus of the present invention.

FIG. 1 is a schematic block diagram of a digital still camera which is an example of an embodiment of an image processing apparatus of the present invention. It should be noted that the digital still camera described herein after is also referred to as an image pickup apparatus.

A digital still camera 100 of the present embodiment includes, as shown in FIG. 1, an image pickup lens 10, a mechanical shutter 12 having a diaphragm function, an image pickup device 14 that converts an optical image into an electric signal, and an A/D converter 16 that converts an analog signal output from the image pickup device 14 into a digital signal, and the like. A timing generation circuit 18 is controlled by a memory control circuit 22 and a system controlling circuit 50, and supplies clock signals or control signals to the image pickup device 14 and the A/D converter 16. The image pickup device 14 is a CMOS or CCD image pickup device having a plurality of pixels arranged in a two-dimensional array. As will be described later, the system controlling circuit 50 controls the timing generation circuit 18 to individually control readout frame rates (readout rates) for respective areas of the image pickup device 14. Specifically, in a case where an image signal is repeatedly readout from a first area of the image pickup device 14 for movie recording, the system controlling circuit 50 changes a readout rate for a second area, which is different from a first area, according to a luminance of a subject while maintaining the readout rate for the first area.

It should be noted that, in addition to the shutter 12, the image pickup device 14 can serve as an electronic shutter, which controls a reset timing to control the accumulation time of an electric charge, and the electronic shutter can apply to movie shooting or the like.

An image processing circuit 20 performs predetermined pixel interpolation processing or color conversion processing on data from the A/D converter 16 or data from the memory control circuit 22. In addition, the image processing circuit 20 performs clipping or zooming processing on an image, which implements an electronic zooming function. Furthermore, the image processing circuit 20 performs image identification on image data, or detects the amount of change from a previous frame image.

In addition, the image processing circuit 20 performs predetermined calculation processing using the shot image data, and the system controlling circuit 50 performs control (AF processing, AE processing, and EF processing of a TTL system) on an exposure controlling unit 40 and a focus control unit 42, based on an acquired calculation result. The image processing circuit 20 calculates a luminance of a subject as an AE evaluation value based on at least one of a first image pickup signal read out from the first area of the image pickup device 14 and a second image pickup signal read out from the second area of the image pickup device 14. Furthermore, the image processing circuit 20 performs the predetermined calculation processing using the shot image data, and also performs AWB (auto white balance) of the TTL system processing based on the acquired calculation result.

The memory control circuit 22 controls the A/D converter 16, the timing generation circuit 18, the image processing circuit 20, a memory 30, and a compressing/decompressing circuit 32. Data from the A/D converter 16 is written in the memory 30 through the image processing circuit 20 and the memory control circuit 22, or directly through the memory control circuit 22. The memory 30 stores shot still image data or movie data. In addition, the memory 30 is available as a work area of the system controlling circuit 50.

An image displaying unit 28 is configured by a TFT display, an LCD, or the like. The image data to be displayed that is written in the memory 30 is displayed by the image displaying unit 28 through the memory control circuit 22. The image displaying unit 28 successively displays the shot image data, which enables the implementation of an electronic viewfinder function.

The system controlling circuit 50 coordinates the control of the whole digital still camera 100. A program code executed by the system controlling circuit 50 is written in a nonvolatile memory 31 such as a flash ROM, and loaded sequentially. In addition, the nonvolatile memory 31 has an area to store system information and an area to store user setting information, and the various pieces of information and settings are loaded from the areas at the next start up.

The compressing/decompressing circuit 32, which is a circuit to compress/decompress image data using the adaptive discrete cosine transform (ADCT) or the like, reads images stored in the memory 30, performs compression processing or decompression processing on the read images, and writes the processed data in the memory 30.

The exposure controlling unit 40 controls the shutter 12, as well as has a function of controlling an electronic flash in conjunction with an electronic flash 48. The focus control unit 42 controls the focusing of the image pickup lens 10, and a zoom controlling unit 44 controls the zooming of the image pickup lens 10. The electronic flash 48 has the flash controlling function as well as a lighting function of AF fill light.

A mode dial 60 switches among and sets functional modes such as power off, an automatic shooting mode, a shooting mode, a panorama shooting mode, a movie shooting mode, a reproduction mode, and PC connection mode.

A shutter switch (SW1) 62 is turned on in the middle of the operation of a shutter button, and makes instruction of the start of operations such as AF (autofocus) processing, AE (automatic exposure) processing, AWB (auto white balance) processing, or the like.

A shutter switch (SW2) 64 is turned on at the completion of the operation of the shutter button. In a case of flash photography, the system controlling circuit 50 causes the image pickup device 14 to be exposed after performing EF (flash control) processing, for an exposure time that is determined in the AE processing. The system controlling circuit 50 then causes the electronic flash 48 to emit light during this exposure time, and causes the exposure controlling unit 40 to shade the image pickup device 14 at the same time as the end of exposure time, terminating the exposure of the image pickup device 14.

In addition, when the shutter switch (SW2) 64 is turned on, the system controlling circuit 50 performs readout processing in which a signal read out from the image pickup device 14 is written in the memory 30 as image data through the A/D converter 16 and the memory control circuit 22.

In addition, when the shutter switch (SW2) 64 is turned on, the system controlling circuit 50 performs development processing through the calculation using the image processing circuit 20 or the memory control circuit 22, or processing in which image data is read out from the memory 30 and compressed by the compressing/decompressing circuit 32. Furthermore, when the shutter switch (SW2) 64 is turned on, the system controlling circuit 50 performs recording processing in which image data is written in a recording medium 200.

A display switching switch 66 switches the display of the image displaying unit 28. This function enables power saving at the time of shooting using an optical viewfinder 104 by cutting off current supply to the image displaying unit 28.

An operating unit 70 is configured by various buttons, a touch panel, a rotatable dial, and the like, for example, a menu button, a setting button, a macro button, a multi-screen reproduction page-change button, an electronic flash setting button, a movie recording switch, a single shooting/consecutive shooting/self-timer switch button, and the like. In addition, the operating unit 70 includes a power switch, a submenu navigation+ (plus) button, a menu navigation− (minus) button, a reproduction image navigation+ (plus) button, a reproduction image navigation− (minus) button, an image pickup quality selection button, an exposure compensation button, a date/time setting button, and the like.

A zoom switch 72 is a switch with which a user performs changing instruction of magnification on a shot image. The zoom switch 72 includes a tele switch used to change a shooting angle of view toward a tele side, and a wide switch used to change the shooting angle of view toward a wide-angle side. Furthermore, the zoom switch 72 serves as a trigger to instruct the zoom controlling unit 44 to change the shooting angle of view of the image pickup lens 10 to perform an optical zooming operation. In addition, the zoom switch 72 also serves as a trigger of clipping an image by the image processing circuit 20, or a trigger of making electronic zooming change to the shooting angle of view through pixel interpolation processing or the like.

A power supply unit 86 is configured by a primary battery such as an alkaline battery, a secondary battery such as a NiCd battery, NiMH battery, and Li-ion battery, and an AC adapter. An I/F 90 is an interface with the recording medium 200, and the recording medium 200 is connected to a connector 92. The recording medium 200 is configured by a memory card, hard disk, or the like, and includes a recording unit 202 such as a semiconductor memory and magnetic disk, an I/F (interface) 204 with the digital still camera 100, and a connector 206 to be connected to the connector 92.

The optical viewfinder 104 enables shooting without using the electronic viewfinder function by the image displaying unit 28. A communication unit 110 has various communicating functions such as a USB, IEEE 1394, LAN, and wireless communication. A connector/antenna 112 is a connector to be used when the digital still camera 100 is connected to another device by the communication unit 110, or an antenna to be used in the wireless communication.

Figure 2:
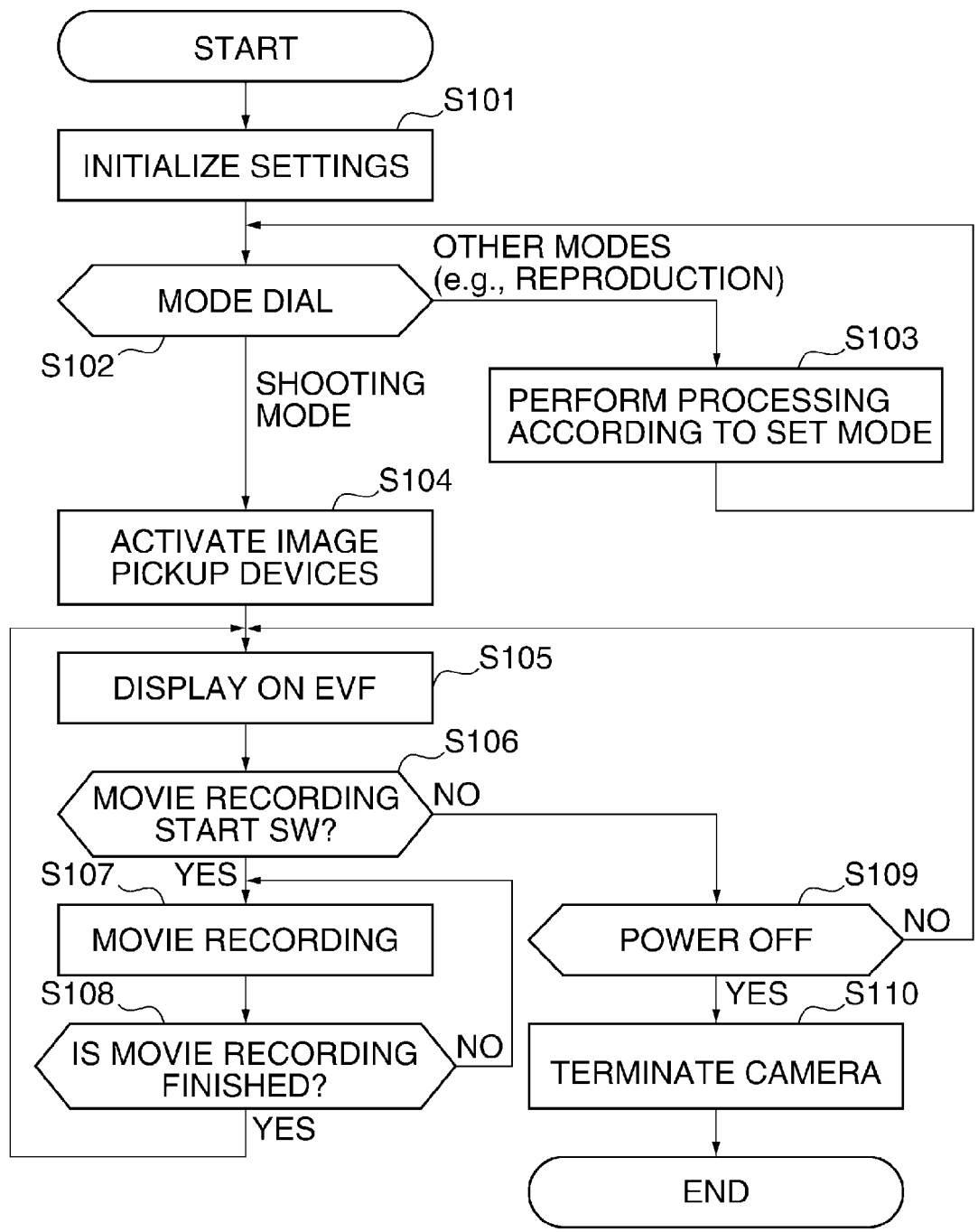
FIG. 2 is a flow chart showing an operation example of the digital still camera.

FIG. 2 is a flow chart showing an operation example of the digital still camera 100. The processing shown in FIG. 2 is implemented by expanding the program stored in the nonvolatile memory 31 onto the memory 30 and executing the expanded program by a CPU or the like of the system controlling circuit 50.

In step S101, the system controlling circuit 50 initializes flags, control variables, and the like in response to turn-on after battery change or the like, and proceeds to step S102.

In step S102, the system controlling circuit 50 determines the set position of a mode dial switch 60. Then, the system controlling circuit 50 proceeds to step S104 if the mode dial switch 60 is set to the shooting mode, or proceeds to step S103 if the mode dial switch 60 is set to the other modes (e.g., reproduction).

In step S103, the system controlling circuit 50 performs processing according to the set mode, and returns to step S102 after the completion of the processing.

In step S104, the system controlling circuit 50 activates the image pickup device 14, and proceeds to step S105. When activating the image pickup device 14, the system controlling circuit 50 causes the image pickup device 14 to operate in a readout mode at a plurality of frame rates (acquisition speed). In this case, for example, a readout frame rate used for the image displaying unit 28 is set to 30 fps, and a readout frame rate used for the AF processing, AE processing, and AWB processing is set to 240 fps.

Here, in the following description, frame readouts at 30 fps are referred to as a mainstream, and frame readouts at 240 fps, which is higher than that of the mainstream, are referred to as a substream. In addition, in both the mainstream and the substream, frame readouts are performed for nine fields in one VD (one vertical synchronization period), a readout in the mainstream consists of a 1/9 field readout, and a frame readout in the substream consists of 2/9 to 9/9 field readouts. The readout rate in the mainstream corresponds to a readout frame rate for the first area of the image pickup device 14, and the readout rate in the substream corresponds to a readout frame rate for the second area of the image pickup device 14.

In addition, there are cases where electronic shutters in the substream can be separately set for respective readout fields, and where an electronic shutter is common to the readout fields. In the case where electronic shutters can be separately set for respective readout fields, the electronic shutters can be generated exclusively for respective readout fields, and is thus unsusceptible to the influence of the electronic shutters for the other readout fields. Therefore, the exposure time of each readout field is from the generation of an exclusive electronic shutter for each readout field until the start of readout of the readout field. In the case where the electronic shutter is common to the readout fields, there is no exclusive electronic shutter for each readout field, and the exposure time is from the generation of an electronic shutter until the start of readout of a readout field.

In step S105, the system controlling circuit 50 sets an EVF displaying state in which image data read out in the mainstream is successively displayed on the image displaying unit 28, and proceeds to step S106.

In step S106, the system controlling circuit 50 determines whether or not the starting operation of movie recording is performed by the movie recording switch of the operating unit 70, and proceeds to step S107 if the starting operation is determined to be performed, or proceeds to step S109 if the starting operation is determined not to be performed.

In step S109, the system controlling circuit 50 determines whether or not a power-off operation of the power switch of the operating unit 70 is performed, and proceeds to step S110 if the power-off operation of the power switch is determined to be performed, or returns to step S105 to continue the EVF displaying state if the power-off operation is determined not to be performed.

In step S110, the system controlling circuit 50 terminates a camera operation to terminate the EVF displaying state in step S105, and finishes the processing.

In step S107, the system controlling circuit 50 starts the movie recording in response to the starting operation of the movie recording performed by the movie recording switch, and proceeds to step S108.

In step S108, the system controlling circuit 50 determines whether or not a finishing operation of the movie recording is performed by the movie recording switch, and finishes the movie recording and returns to step S105 if the finishing operation is determined to be performed.

Next, with reference to FIG. 3 to FIG. 9, control examples of the image pickup device 14 in a movie recording operation in step S107 in FIG. 2 will be described.

Figure 3:
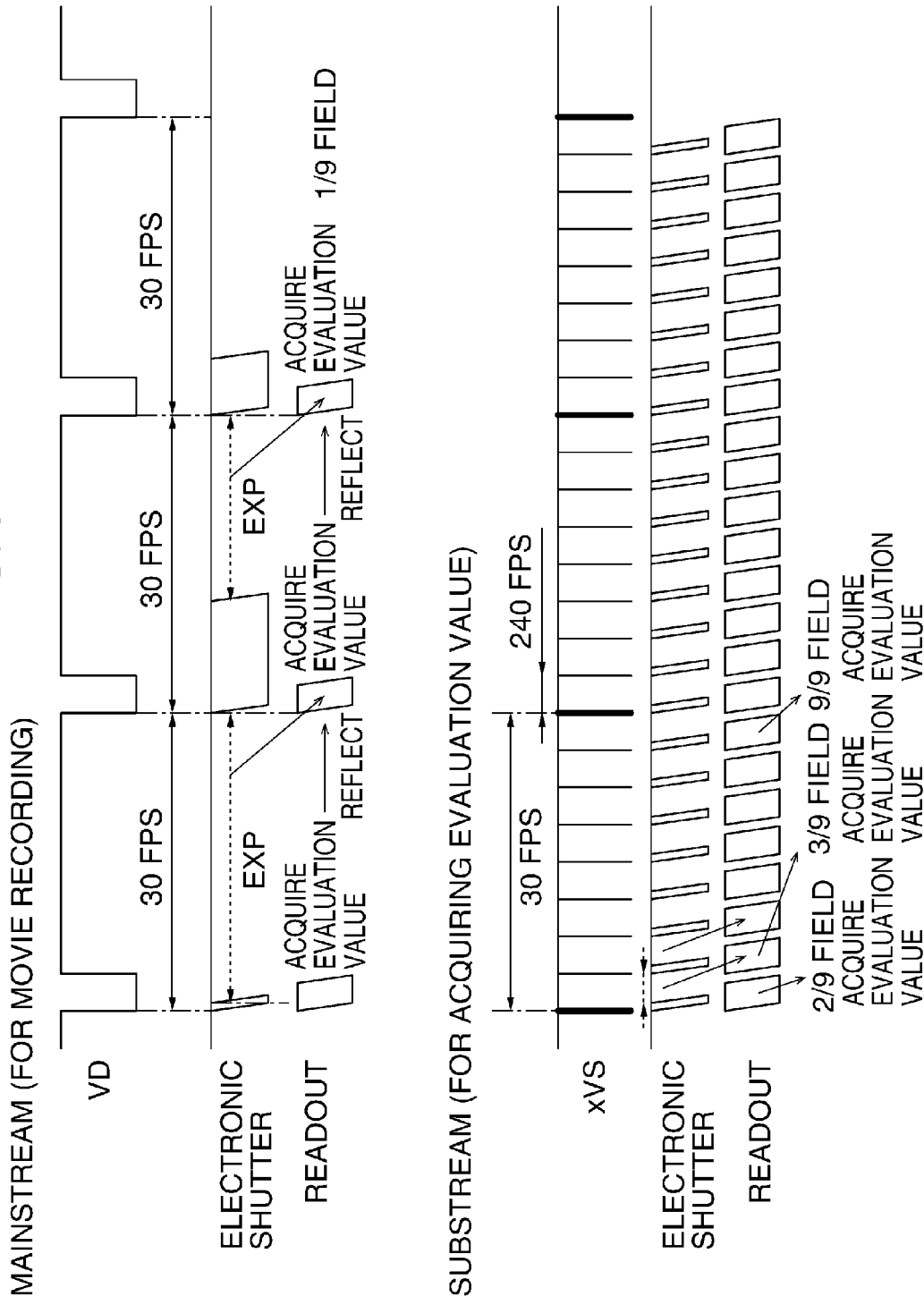
FIG. 3 is a timing chart showing a driving example of an image pickup device in a movie recording operation, in a case where an electronic shutter in a substream is common to readout fields.

FIG. 3 is a timing chart showing a driving example of the image pickup device 14 in the movie recording operation in the case where the electronic shutter used in the substream is common to the readout fields. As shown in FIG. 3, in the movie recording operation, the image pickup device 14 is caused to operate in the readout mode at a plurality of frame rates. In the present embodiment, the mainstream is used for the movie recording, and the substream is used for acquiring the evaluation values of AF, AE, and AWB. It should be noted that the term "EXP" in FIG. 3 represents an exposure time, and in the substream, portions corresponding to the exposure times in the mainstream, which are however not represented by "EXP," are exposure times.

Here, the mainstream is equivalent to an example of a first readout unit. In addition, the substream is equivalent to an example of a second readout unit.

In FIG. 3, since the electronic shutter used in the substream is common to the readout fields, the maximum exposure time in the substream is about 4 ms (240 fps=about 4 ms).

In addition, the evaluation values are acquired also in the mainstream besides the substream. In the present embodiment, the frame rate in the movie recording is fixed to 30 fps. Normally, the AF processing, AE processing, and AWB processing are performed based on the evaluation values acquired in the substream at high rate and the evaluation values acquired in the mainstream, and the movie recording is performed in a suitable subject state. Here, the suitable subject state refers to a state in which the subject is focused and the colors of the subject are correctly determined in a state in which a suitable exposure of the subject is calculated.

Figure 4:
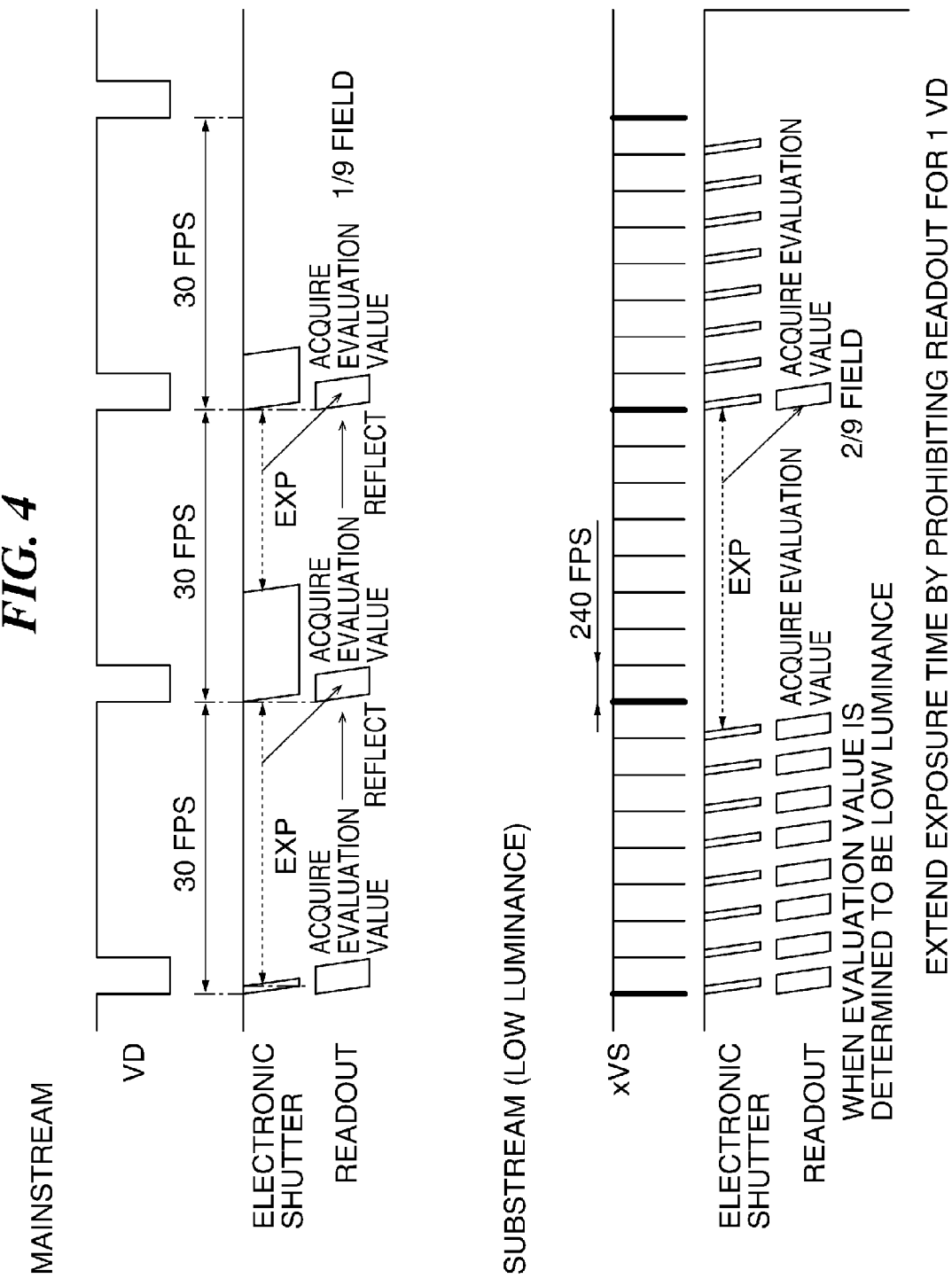
FIG. 4 is a timing chart showing a driving example of the image pickup device when an AE evaluation value acquired in the substream is determined to indicate a low luminance, in the case where the electronic shutter in the substream is common to the readout fields.

FIG. 4 is a timing chart showing a driving example of the image pickup device 14 when an AE evaluation value acquired in the substream is determined to indicate a low luminance in the case where the electronic shutter in the substream is common to the readout fields. Here, the case where the AE evaluation value is determined to indicate a low luminance refers to a case where the system controlling circuit 50 determines, through the image processing circuit 20, that the luminance of the subject is lower than a predetermined threshold value (predetermined value) due to changes in the state of the subject in the image data acquired in the mainstream and the substream.

In FIG. 4, when the AE evaluation value acquired in the substream is determined to indicate a low luminance, a readout method in the substream is changed while the frame rate in the mainstream used for the movie recording is maintained at 30 fps. Namely, when an image signal is repeatedly read out from the first area of the image pickup device 14 for movie recording, the system controlling circuit 50 changes the readout rate for the second area, which is different from the first area, according to the luminance of the subject calculated based on the second image pickup signal readout from the second area while maintaining the readout rate for the first area.

Specifically, by prohibiting the readout in the substream for one VD, the exposure time in the substream is increased to 4 ms or more. In addition, by prohibiting the readout in the substream for one VD or more, the exposure time is adjusted so as to make the exposure in the substream suitable.

Figure 5:
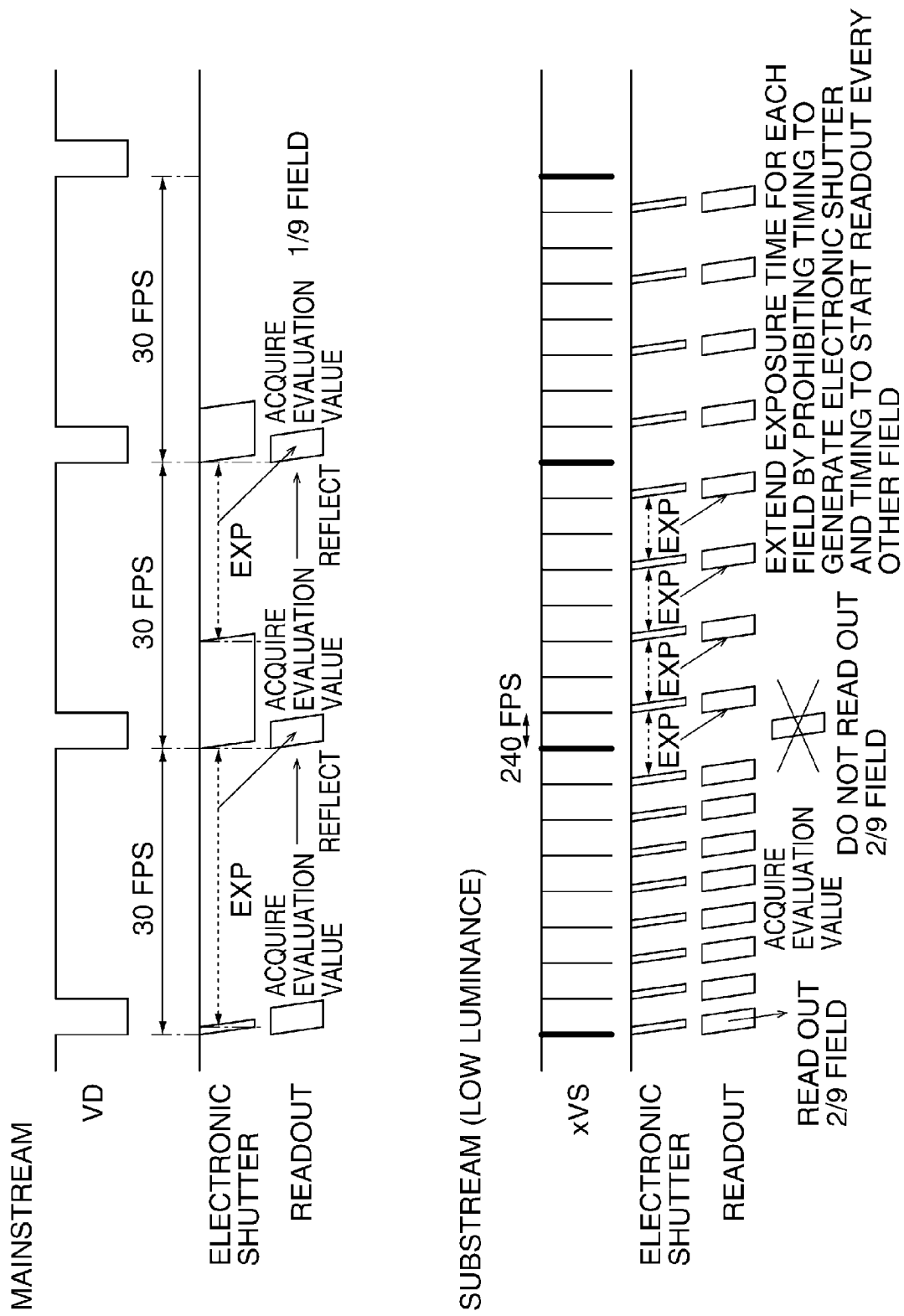
FIG. 5 is a timing chart showing a case where a readout method in the substream is changed by a method different from that in FIG. 4, in the case where the electronic shutter in the substream is common to the readout fields.

FIG. 5 is a timing chart showing a case where the readout method in the substream is changed by a method different from that in FIG. 4, in the case where the electronic shutter in the substream is common to the readout fields.

In FIG. 5, by prohibiting a timing to generate the electronic shutter and a timing to start the readout to every other field, the frame rate is reduced to extend the exposure time of each field.

Specifically, by prohibiting the readouts to 2/9 field, 4/9 field, 6/9 field, and 8/9 field, the exposure times of 3/9 field, 5/9 field, 7/9 field, and 9/9 field are extended.

In addition, by prohibiting the timing to generate the electronic shutter and the timing to start the readout for one field or more, the exposure time is adjusted so as to make the exposure in the substream suitable.

Figure 6:
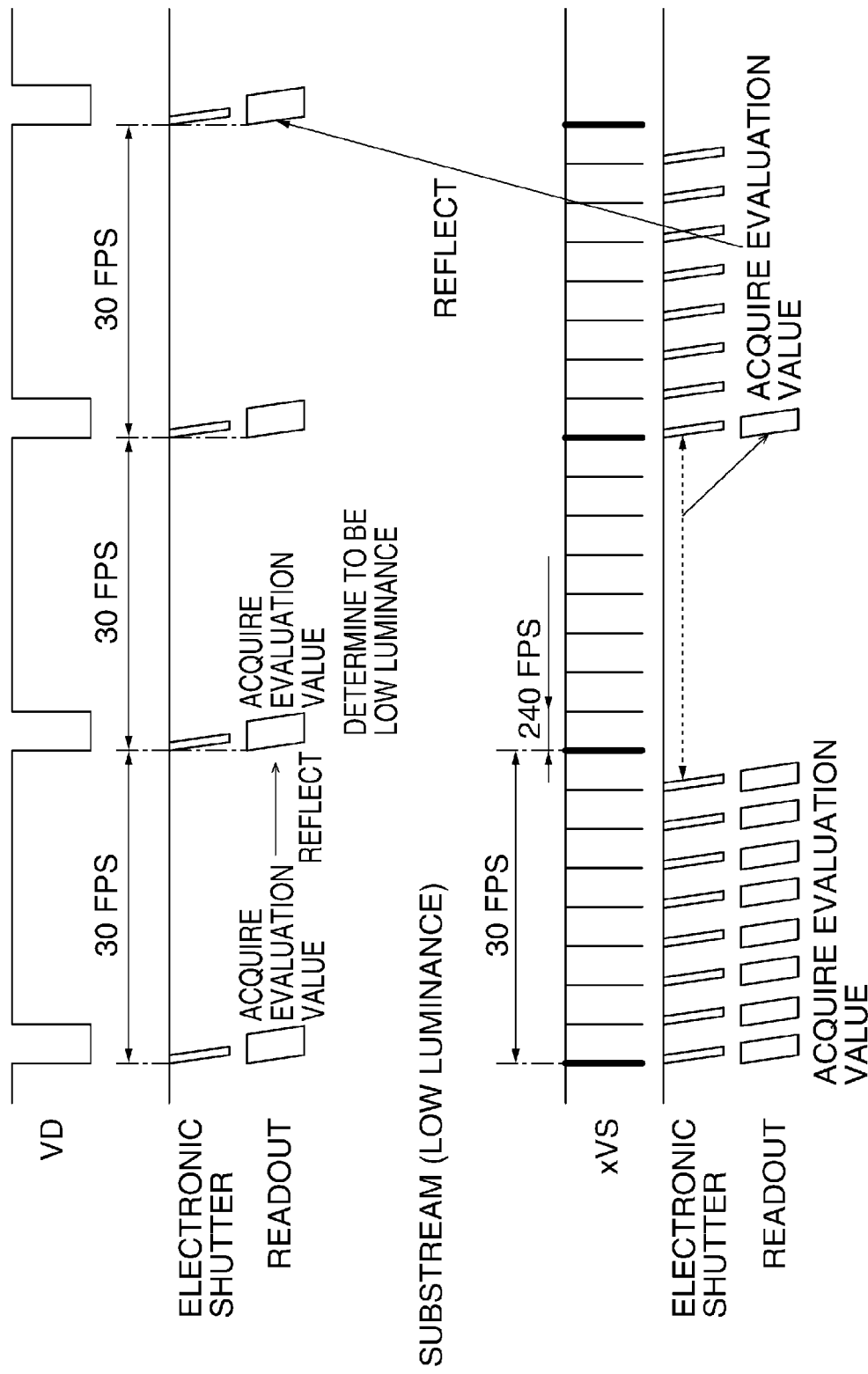
FIG. 6 is a timing chart showing a driving example of the image pickup device when an AE evaluation value acquired in the mainstream is determined to indicate a low luminance, in the case where the electronic shutter in the substream is common to the readout fields.

FIG. 6 is a timing chart showing a driving example of the image pickup device 14 when an AE evaluation value acquired in the mainstream is determined to indicate a low luminance, in the case where the electronic shutter in the substream is common to the readout fields. Namely, when an image signal is repeatedly read out from the first area of the image pickup device 14 for movie recording, the system controlling circuit 50 changes the readout rate for the second area, which is different from the first area, according to the luminance of the subject calculated based on the first image pickup signal readout from the first area while maintaining the readout rate for the first area.

When the AE evaluation value in the mainstream is determined to indicate a low luminance, by prohibiting the readout in the substream for one VD or more as with FIG. 4, the exposure time is adjusted so as to make the exposure in the substream suitable. Subsequently, by reflecting the evaluation value for which an exposure time is made to be suitable in the substream to the output of the mainstream, it is possible to suitably set the AE processing, and the AWB processing in the mainstream.

This is because output values from the mainstream are small, which hinders evaluation values from being correctly acquired, and using the evaluation values to perform AF processing, AE processing, and AWB processing may fail to perform the processing accurately.

Figure 7:
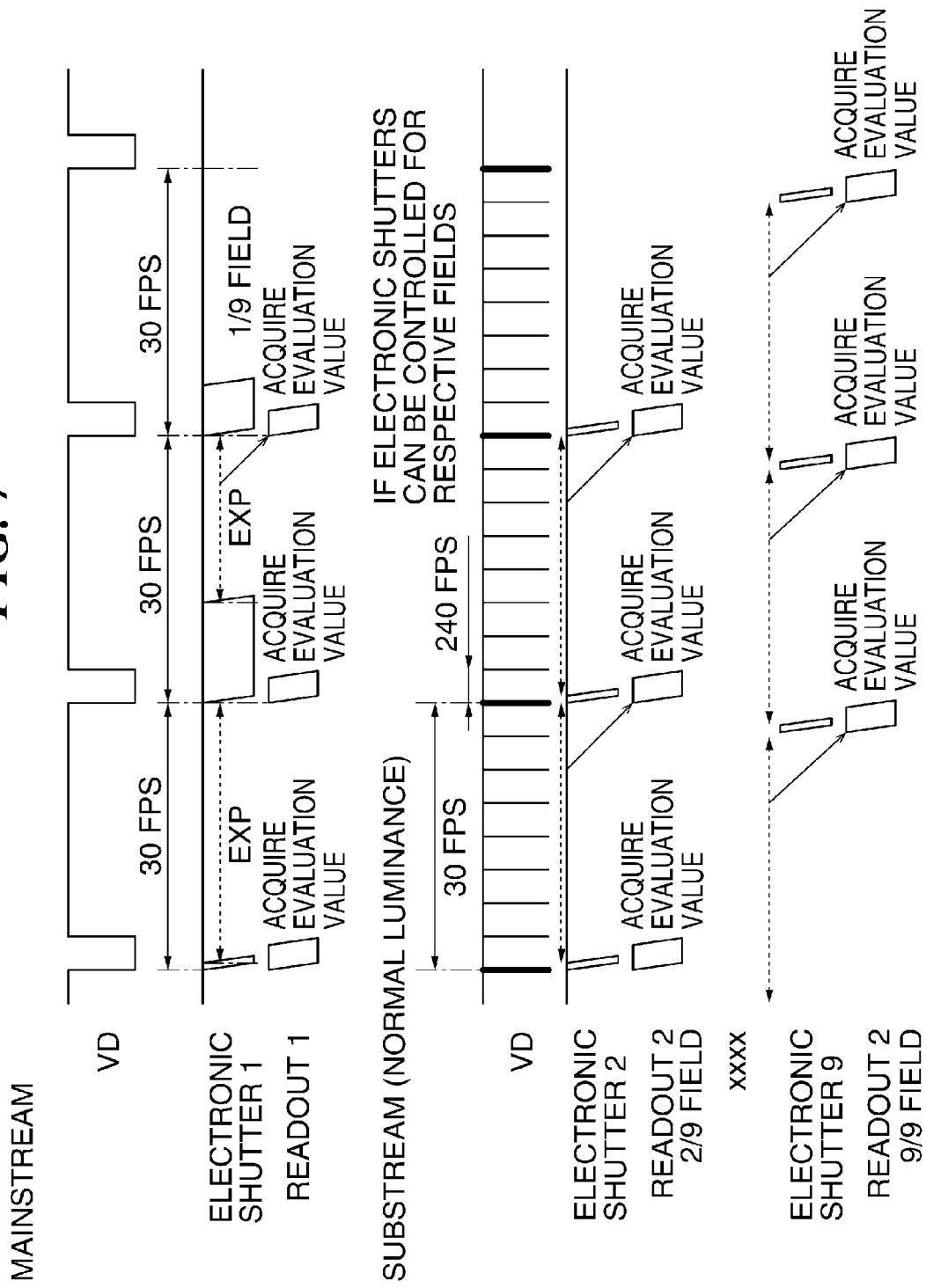
FIG. 7 is a timing chart showing a driving example of the image pickup device in the movie recording operation, in a case where the electronic shutters in the substream can be separately set for respective readout fields.

FIG. 7 is a timing chart showing a driving example of the image pickup device 14 in the movie recording operation, in a case where the electronic shutters in the substream can be separately set for respective readout fields.

As shown in FIG. 7, in the movie recording operation, the image pickup device 14 is caused to operate in a readout mode at a plurality of frame rates. In the driving example in FIG. 7, as described above, the mainstream is used for the movie recording, and the substream is used for acquiring the evaluation values of the AF, AE, and AWB.

In FIG. 7, since the electronic shutters in the substream can be separately set for respective readout fields, the maximum exposure time in the substream is about 33 ms (30 fps=about 33 ms).

In addition, the evaluation values are acquired also in the mainstream besides the substream. Here, the frame rate in the movie recording is fixed to 30 fps.

Figure 8:
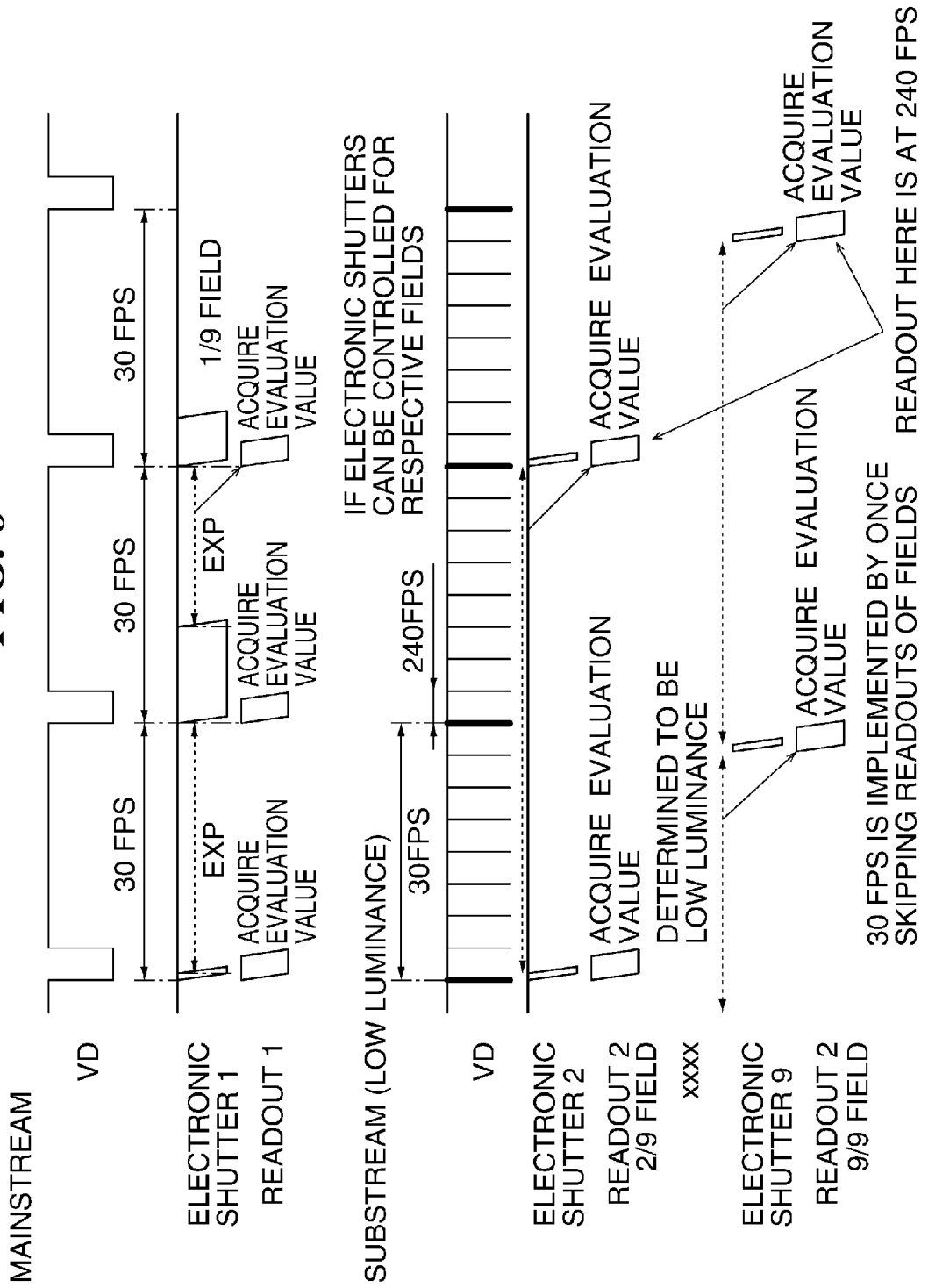
FIG. 8 is a timing chart showing a driving example of the image pickup device when the AE evaluation value acquired in the substream is determined to indicate a low luminance, in a case where the electronic shutters in the substream are separately set for respective readout fields.

FIG. 8 is a timing chart showing a driving example of the image pickup device 14 when the AE evaluation value acquired in the substream is determined to indicate a low luminance, in a case where the electronic shutters in the substream are separately set for respective readout fields.

In FIG. 8, the readout method in the substream is changed while the frame rate in the mainstream used for the movie recording is maintained at 30 fps. Specifically, by prohibiting the readout in the substream for one VD, the exposure time in the substream is increased to 33 ms or more. In addition, by prohibiting the readout in the substream for one VD or more, the exposure time is adjusted so as to make the exposure in the substream suitable.

Figure 9:
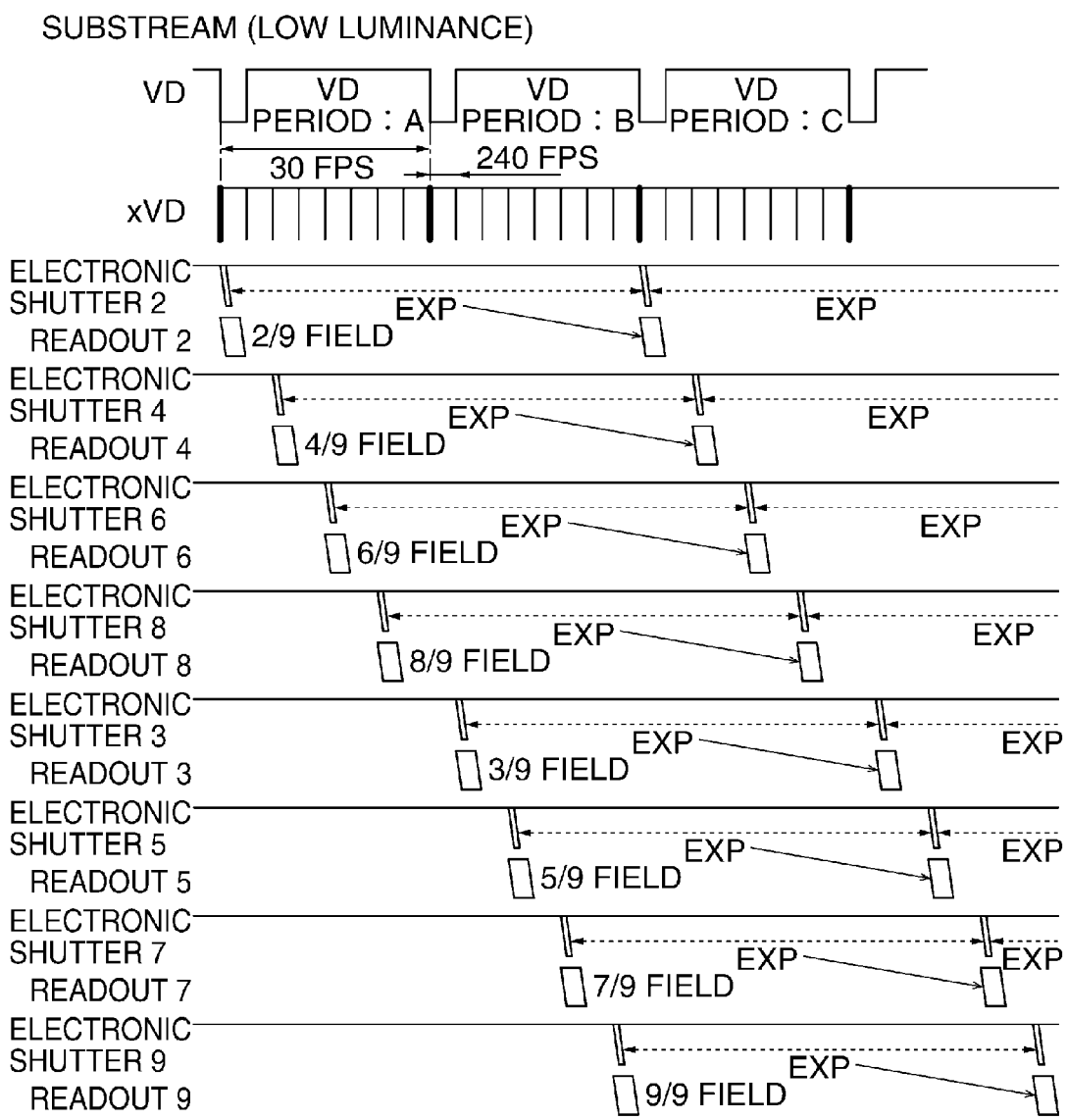
FIG. 9 is a timing chart showing a case where the readout method in the substream is changed by a method different from that in FIG. 8, in the case where the electronic shutters in the substream are separately set for respective readout fields.

FIG. 9 is a timing chart showing a case where the readout method in the substream is changed by a method different from that in FIG. 8, in the case where the electronic shutters in the substream are separately set for respective readout fields.

In FIG. 9, the exposure time in the substream is made to be 33 ms or more by prohibiting the readout in the substream for one VD as with FIG. 8, and even-numbered fields and odd-numbered fields are alternately set as the readout fields which are prohibited from the readout during one VD period. Specifically, in a VD period A, the 2/9, 4/9, 6/9, and 8/9 fields are read out, and the readouts are prohibited to the 3/9, 5/9, 7/9, and 9/9 fields. In a VD period B, contrariwise, the 3/9, 5/9, 7/9, and 9/9 fields are read out, and the readouts are prohibited to the 2/9, 4/9, 6/9, and 8/9 fields.

It should be noted that the setting of the readout-prohibited readout fields in each period is not limited to the even-numbered fields or the odd-numbered fields, and for example, it is possible to make setting such that the 2/9, 3/9, 4/9, and 5/9 fields are read out in the VD period A, and the 6/9, 7/9, 8/9, and 9/9 fields are read out in the VD period B.

As described above, in the present embodiment, it is possible to correctly acquire evaluation values of AF, AE, and AWB while the frame rate in movie recording is maintained, even with a low luminance, which enables the AF, AE, and AWB processing to be accurately performed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-259305, filed Dec. 16, 2013, which is hereby incorporated by reference wherein in its entirety.

What is claimed is:

1. An image pickup apparatus comprising:
   an image pickup device having a plurality of pixels arranged in a two-dimensional array;
   a first driver that drives the image pickup apparatus to acquire first image data from a first readout area of the image pickup device;
   a second driver that drives the image pickup device to acquire second image data from a second readout area, which is different from the first readout area, of the image pickup device; and
   a controller that:
      changes a readout rate of the second image data to extend an exposure time for the image pickup device in a case where the luminance of the subject becomes lower; and
      reflects an evaluation value of a state of the subject based on the second image data acquired from the second readout area to the first image data after extending an exposure time for the image pickup device.

2. The image pickup apparatus according to claim 1, wherein the controller lowers the readout rate to extend the exposure time for the image pickup device in a case where the luminance of the subject becomes lower.

3. The image pickup apparatus according to claim 1, further comprising a calculator that calculates the luminance of the subject based on at least one of the first image data or the second image data.

4. The image pickup apparatus according to claim 1, wherein the controller sets the readout rate of the second image data longer in a case where the luminance of the subject is less than a predetermined value than a case where the luminance of the subject is equal or more than the predetermined value.

5. The image pickup apparatus according to claim 1, wherein the controller changes an exposure time for the first readout area according to the luminance of the subject.

6. The image pickup apparatus according to claim 1, wherein the controller changes an exposure time for the second readout area according to the luminance of the subject.

7. The image pickup apparatus according to claim 1, wherein the readout rate of the second image data is different from the readout rate of the first image data.

8. The image pickup apparatus according to claim 7, wherein the readout rate of the second image data is higher than the readout rate of the first image data.

9. A control method of controlling an image pickup apparatus having an image pickup device having a plurality of pixels arranged in a two-dimensional array, the control method comprising:
   a first driving step of driving the image pickup device, using a first driver, to acquire first image data from a first readout area of the image pickup device;
   a second driving step of driving the image pickup device, using a second driver, to acquire second image data from a second readout area, which is different from the first readout area, of the image pickup device;
   a controlling step of changing, using a controller, a readout rate of the second image data to extend an exposure time for the image pickup device in a case where the luminance of the subject becomes lower; and
   a controlling step of reflecting an evaluation value of a state of the subject based on the second image data acquired from the second readout area to the first image data after extending an exposure time for the image pickup device.

10. A non-transitory computer readable storage medium that stores a program executable by a computer to execute a control method for an image processing apparatus having a plurality of pixels arranged in a two-dimensional array, the control method comprising:
   a first driving step of driving the image pickup device, using a first driver, to acquire first image data from a first readout area of the image pickup device;
   a second driving step of driving the image pickup device, using a second driver, to acquire second image data from a second readout area, which is different from the first readout area, of the image pickup device;
   a controlling step of changing, using a controller, a readout rate of the second image data to extend an exposure time for the image pickup device in a case where the luminance of the subject becomes lower; and
   a controlling step of reflecting an evaluation value of a state of the subject based on the second image data acquired from the second readout area to the first image data after extending an exposure time for the image pickup device.

* * * * *